Patented Dec. 2, 1941

2,264,625

UNITED STATES PATENT OFFICE 2,264,625

VINYL RESIN COMPOSITIONS

Arthur K. Doolittle, South Charleston, W. Va., assignor to Carbide and Carbon Chemicals Corporation, a corporation of New York No Drawing. Application May 31, 1939, Serial No. 276,584

10 Claims. (Cl. 260—32)

The invention relates to vinyl resin compositions of particular usefulness in the preparation of lacquers, varnishes, dopes and other coating and finishing materials. It is especially concerned with new and improved solvents for use in compounding vinyl resin compositions.

While vinyl resins of various kinds have been proposed for and used in surface coating compositions, the inherent physical and chemical characteristics of these resins have presented many problems in the formulating of satisfactory lacquers and the like. An important one of these problems has arisen through the difficulty of obtaining suitable and proper solvents for these resins. Many compounds known to have a solvent action on other kinds of lacquer gums and resins will not dissolve the vinyl resins, or if they do exhibit solvent power for the latter resins, they are often deficient in other characteristics. A high boiling solvent suitable for use in vinyl resin lacquers should dissolve a high content of resin without exhibiting troublesome gellation. It should permit dilution with substantial quantities of cheaper hydrocarbon diluents, and should not deteriorate on storage. Water insolubility is a further desirable property.

It is an object of this invention to provide solvent materials for vinyl resins having all of the above-mentioned desirable properties, and to produce thereby improved vinyl resin lacquers, varnishes, and other coating compositions.

I have found that certain cyclic ketones, in particular isophorone and di-hydroisophorone, have a marked solvent power for vinyl resins, and in addition exhibit the other properties required for their satisfactory use in lacquer thinner formulae. Isophorone, which may also be termed 3,5,5-trimethyl $\Delta^2$-cyclohexenone, can be formed from the condensation of acetone in the presence of suitable catalysts, such as lime or sodium ethylate, and by hydrogenation of this compound the saturated product, di-hydroisophorone, is formed. Both of the compounds are liquids of substantially water-white or faintly yellow color. They are water insoluble and have a very high boiling point. Isophorone boils at about 205° C. to 217° C., and the saturated derivative at a slightly lower temperature. The compounds have a very slow evaporation rate which is effective in improving the flowing and leveling properties of a vinyl resin lacquer by maintaining a maximum fluidity in an applied surface film as the thinner components evaporate on drying. In formulating thinner compositions these solvents will permit of substantial dilution with inexpensive non-solvent diluents, such as xylene, or other hydrocarbon derivatives suitable for thinning in a slowly evaporating mixture.

A very valuable and important characteristic of these new solvents resides in their ability to form solutions of certain vinyl resins high in solids concentration without encountering a thixotropic effect or gellation. Solutions of resin of the type formed by conjoint polymerization of a vinyl halide with a vinyl ester normally show the viscosity effect of thixotropism to a considerable degree, which has necessitated heretofore a limitation in the solids to solvent ratio well below the actual point of gellation to insure a satisfactory fluid condition. With isophorone or dihydroisophorone as the solvent these resins may be dissolved in concentrations considerably higher, and very close to the gel point, without exhibiting any appreciable tendency toward thixotropism. For example, 25% solutions of a conjointly polymerized product of vinyl chloride and vinyl acetate in a mixture of 55% isophorone, and 45% xylene are still in a satisfactory fluid state, whereas with a solvent of an acetone-toluene mixture in corresponding proportions, not more than 20% of the same resin may be introduced without causing abnormal viscosity effects. The new solvents will thus permit a wider and greater formulating range of solid to solvent ratios than has heretofore been possible with prior vinyl resin solvents.

A further phenomenon is shown by both solvent materials, which is quite unusual, and consists in the fact that at a constant vinyl resin concentration in the solvent a decreased solution viscosity is shown as diluent is added up to a certain point, and the solution viscosity then increases as more diluent is added. This provides a means whereby a solution of the resin in a mixture of either of these solvents and a suitable diluent, such as xylene, can be made up with a lower viscosity than a solution of the same solids content in the solvent alone, and presents distinct advantages in formulating lacquers for roller-coating application, through the ability to achieve improved flow-out with a minimum viscosity.

The vinyl resins with which the invention is directly concerned include those which may be formed by polymerization of a vinyl halide, a vinyl ester, such as vinyl acetate, or by the conjoint polymerization of a vinyl halide with a vinyl ester of the lower aliphatic acids, such as vinyl acetate, propionate, butyrate, and formate. Polymerized vinyl chloride, and the product resulting from conjointly polymerizing vinyl chloride and vinyl acetate, in proportions of about 60 to 95 parts by weight of vinyl chloride to from 40 to 5 parts by weight of the acetate, are preferred resin components in compositions employing these new solvents. As coating materials especially suitable for application by roller-coating, the solvents have proven of particular merit in conjunction with the conjointly polymerized vinyl chloride and vinyl acetate product containing about 80% to 90% by weight of vinyl chloride, and having an average molecular weight of from about 8,000 to 12,000, as estimated from the specific viscosity of dilute solutions according to Staudinger's method. The method of forming the vinyl resins forms no part of the present invention, and they may be prepared in any manner known to the art.

In a complete thinner formula the actual proportions of both the isophorone and di-hydroisophorone may be varied over a wide range, and the most desirable concentrations will depend on a number of factors. The particular vinyl resin employed, the nature of the other solid ingredients in the lacquer, the method of application and the required use of the coating composition, must all be considered in determining the most suitable solvent requirements, which in addition are usually maintained within the most economical limits. Because of their high boiling point, the solvents are of preferred use in the formulating of lacquers for application while hot or by means of roller-coating, or for the preparation of graining inks, stencil pastes and like compositions. Representative lacquer compositions within the scope of the invention are shown by the following two formulae, in which the vinyl resin base is the conjointly polymerized product of vinyl chloride and vinyl acetate containing about 80% to 90% of vinyl chloride.

|  | Pigmented lacquer | Clear lacquer |
|---|---|---|
|  | Percent by weight | Percent by weight |
| Vinyl resin | 14.5 | 18 |
| Tricresyl phosphate | 6.4 | 6 |
| Isophorone | 11.2 | 30 |
| Xylene | 22.4 | 46 |
| White lead | 7.4 |  |
| Antimony oxide | 1.6 |  |
| Titanium dioxide | 14.1 |  |
| Methyl amyl ketone | 5.6 |  |
| Tetrahydronaphthalene | 16.8 |  |

As shown by the above examples, other materials of a solvent action on the resin may be used in conjunction with those here disclosed without departing from the spirit of this invention, and the usual lacquer modifying agents, such as stabilizers, plasticizers, dyes, pigments, and the like, can be included without effect upon the essential advantages afforded by these new solvent compounds. Numerous modifications in a complete coating composition are intended to be included within the invention, which should not be limited beyond the scope of the appended claims.

I claim:

1. A composition of matter essentially comprising a polymerized vinyl ester resin, and a solvent therefor comprising a member of the group consisting of isophorone and di-hydroisophorone.

2. A composition of matter essentially comprising a polymerized vinyl ester resin dissolved in a solvent containing a member of the group consisting of isophorone and di-hydroisophorone as an essential solvent material.

3. A composition of matter essentially comprising a vinyl ester resin containing a polymerized vinyl halide dissolved in a solvent containing a member of the group consisting of isophorone and di-hydroisophorone as an essential solvent material.

4. A vinyl resin composition essentially comprising polymerized vinyl chloride dissolved in a solvent containing a member of the group consisting of isophorone and di-hydroisophorone as an essential solvent material.

5. A vinyl resin composition essentially comprising polymerized vinyl acetate dissolved in a solvent containing a member of the group consisting of isophorone and di-hydroisophorone as an essential solvent material.

6. A vinyl resin composition essentially comprising a resin substantially identical with that resulting from the conjoint polymerization of a vinyl halide with a vinyl ester of an aliphatic acid, dissolved in a solvent containing a member of the group consisting of isophorone and di-hydroisophorone as an essential solvent material.

7. A vinyl resin coating composition essentially comprising a resin substantially identical with that resulting from the conjoint polymerization of vinyl chloride and vinyl acetate and containing from 80% to 90% by weight of vinyl chloride, dissolved in a solvent containing a member of the group consisting of isophorone and di-hydroisophorone as an essential solvent material.

8. A vinyl resin coating composition essentially comprising a resin substantially identical with that resulting from the conjoint polymerization of vinyl chloride and vinyl acetate and containing from 80% to 90% by weight of vinyl chloride, dissolved in a thinner containing as an essential solvent material a member of the group consisting of isophorone and di-hydroisophorone, and a volatile hydrocarbon diluent.

9. A vinyl resin coating composition essentially comprising a resin substantially identical with that resulting from the conjoint polymerization of vinyl chloride and vinyl acetate and containing from 80% to 90% by weight of vinyl chloride, dissolved in a thinner containing isophorone as an essential solvent material and a volatile non-solvent hydrocarbon diluent.

10. A vinyl resin coating composition essentially comprising a resin substantially identical with that resulting from the conjoint polymerization of vinyl chloride and vinyl acetate and containing from 80% to 90% by weight of vinyl chloride, dissolved in a thinner containing di-hydroisophorone as an essential solvent material and a volatile non-solvent hydrocarbon diluent.

ARTHUR K. DOOLITTLE.